O. L. ROUTT, G. C. McCONNELL, AND H. L. GLAZE.
MACHINE FOR MAKING PLASTER BOARD AND THE LIKE.
APPLICATION FILED SEPT. 13, 1918.
1,432,261. Patented Oct. 17, 1922.
12 SHEETS—SHEET 1.
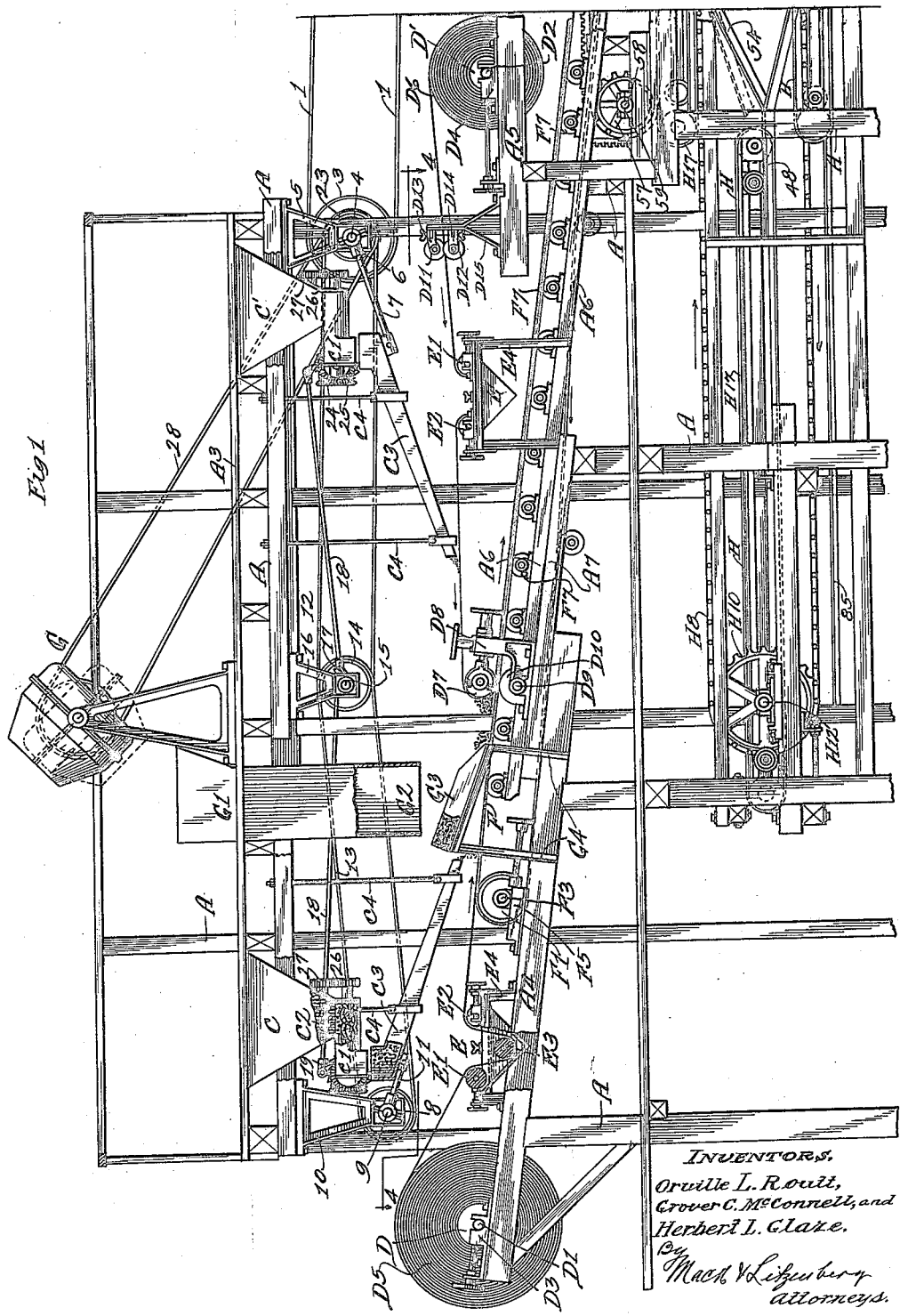
INVENTORS.
Orville L. Routt,
Grover C. McConnell, and
Herbert L. Glaze.
By Mack & Litzenberg
Attorneys.

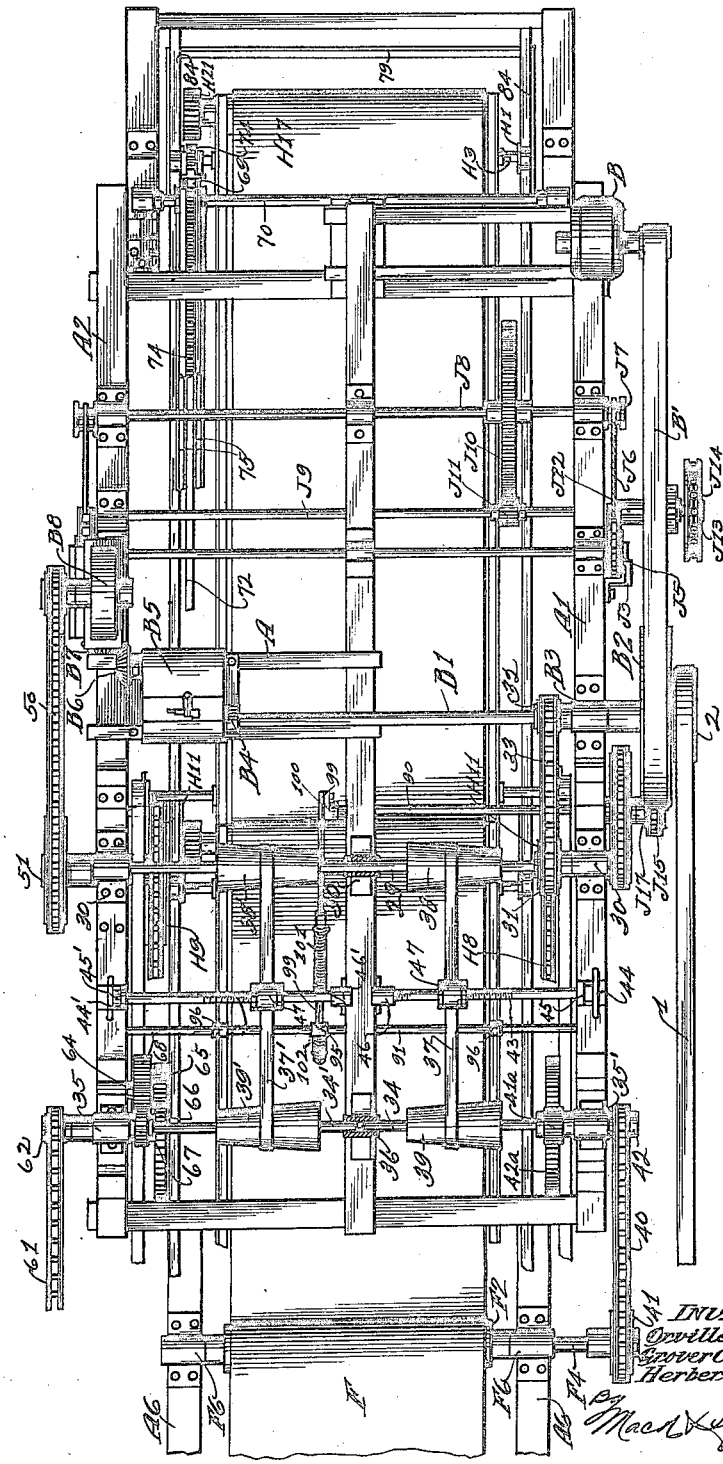

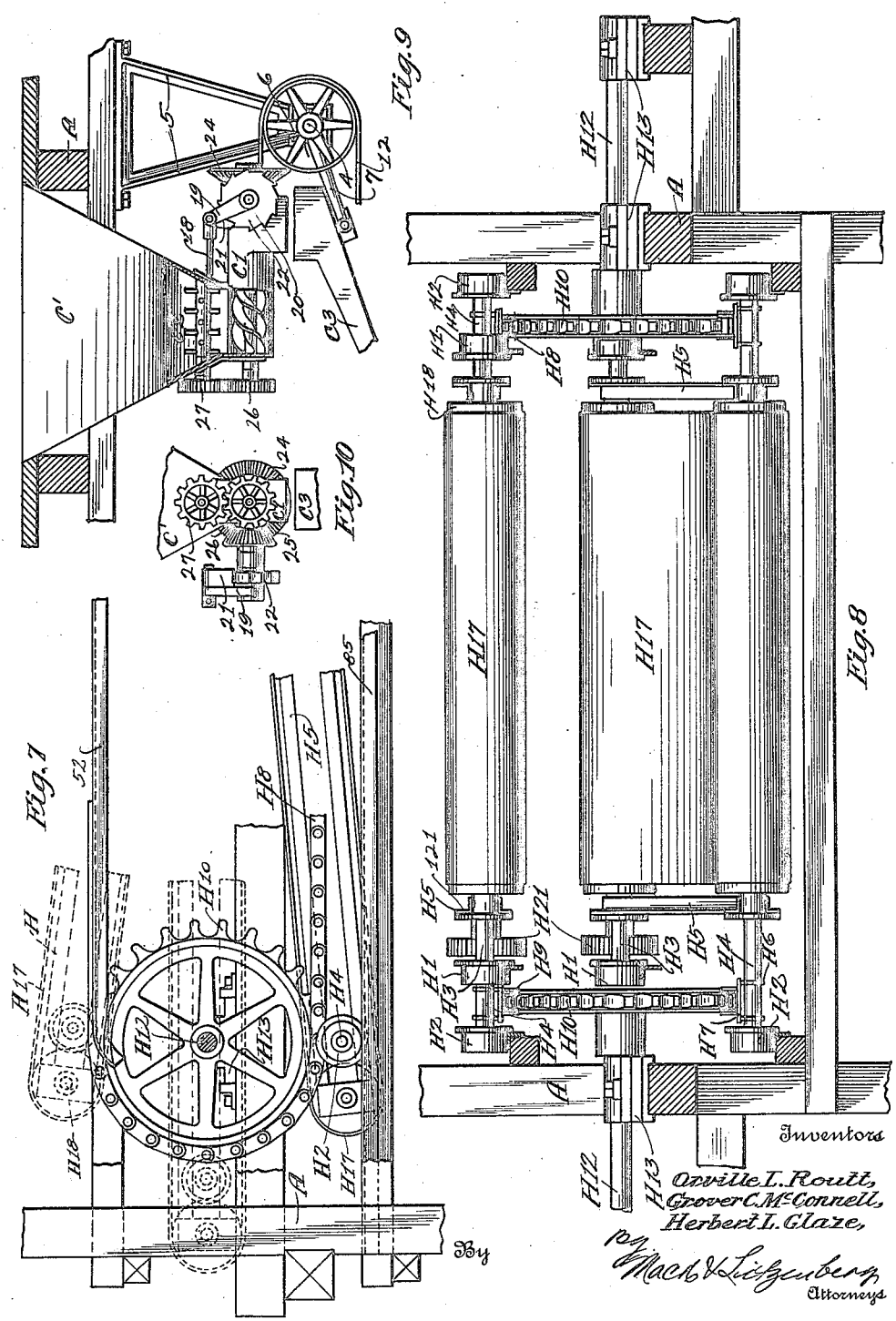

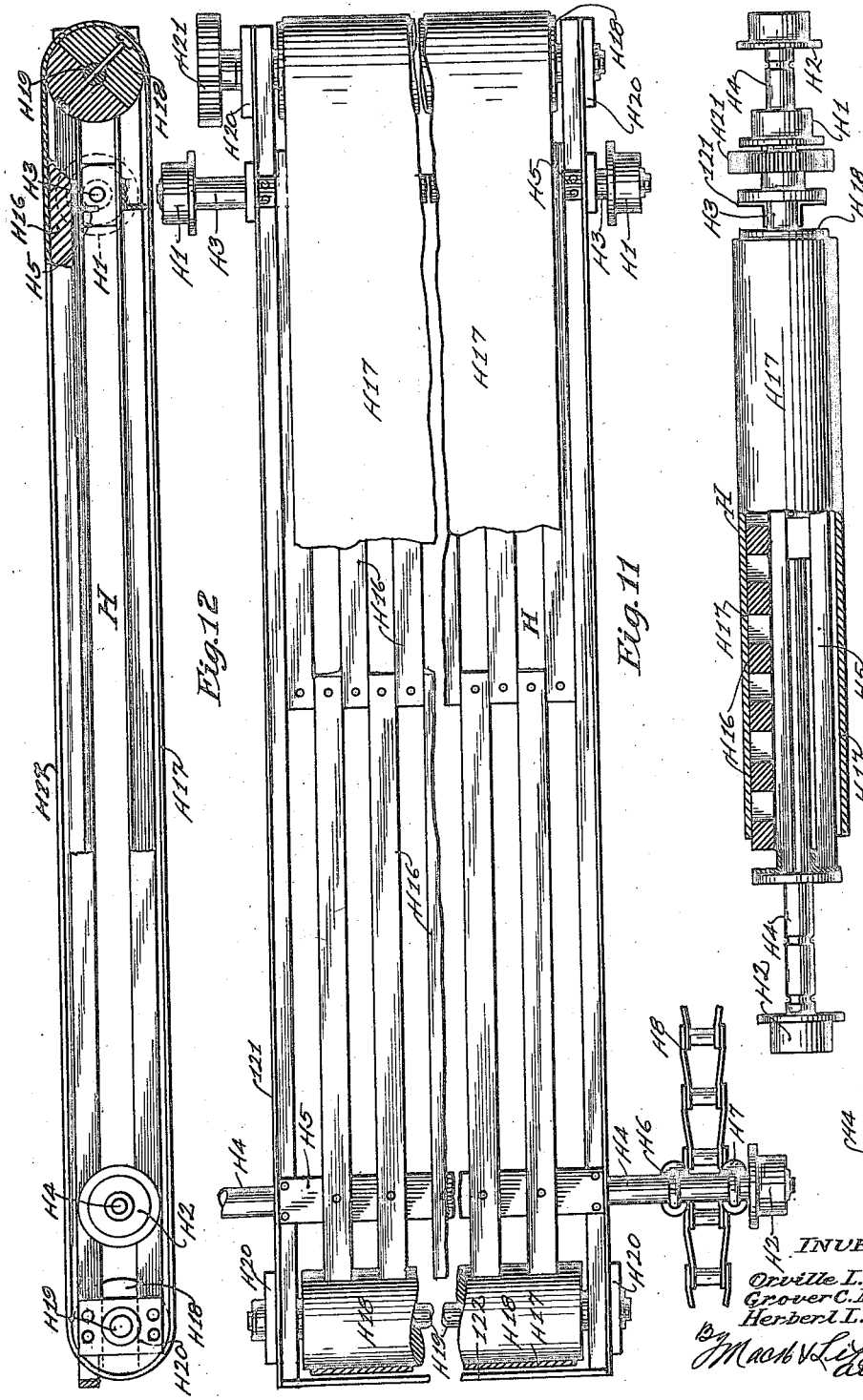

O. L. ROUTT, G. C. McCONNELL, AND H. L. GLAZE.
MACHINE FOR MAKING PLASTER BOARD AND THE LIKE.
APPLICATION FILED SEPT. 13, 1918.
1,432,261. Patented Oct. 17, 1922.
12 SHEETS—SHEET 10.
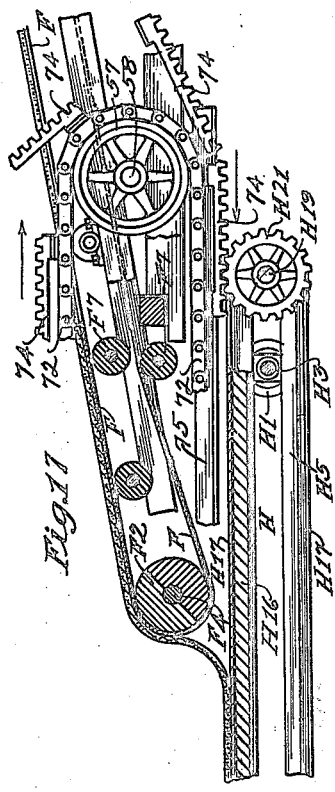
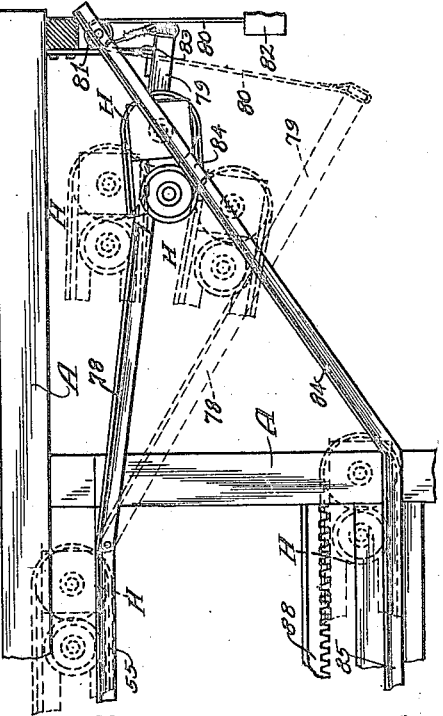
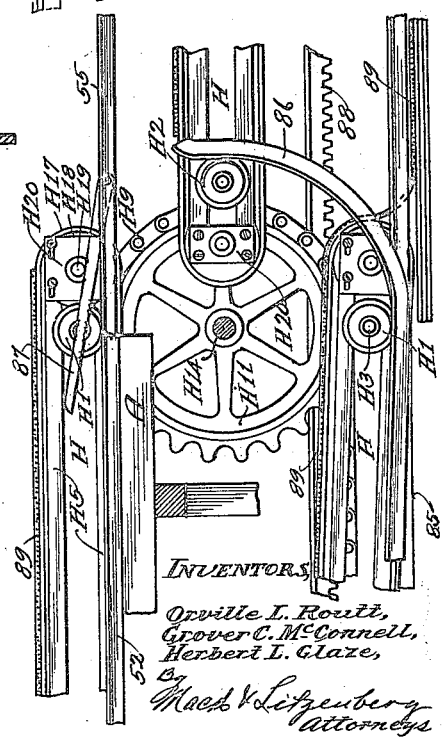
INVENTORS
Orville L. Routt,
Grover C. McConnell,
Herbert L. Glaze,
By Mack & Litzenberg
Attorneys O. L. ROUTT, G. C. McCONNELL, AND H. L. GLAZE.
MACHINE FOR MAKING PLASTER BOARD AND THE LIKE.
APPLICATION FILED SEPT. 13, 1918.
1,432,261.
Patented Oct. 17, 1922.
12 SHEETS—SHEET 11.
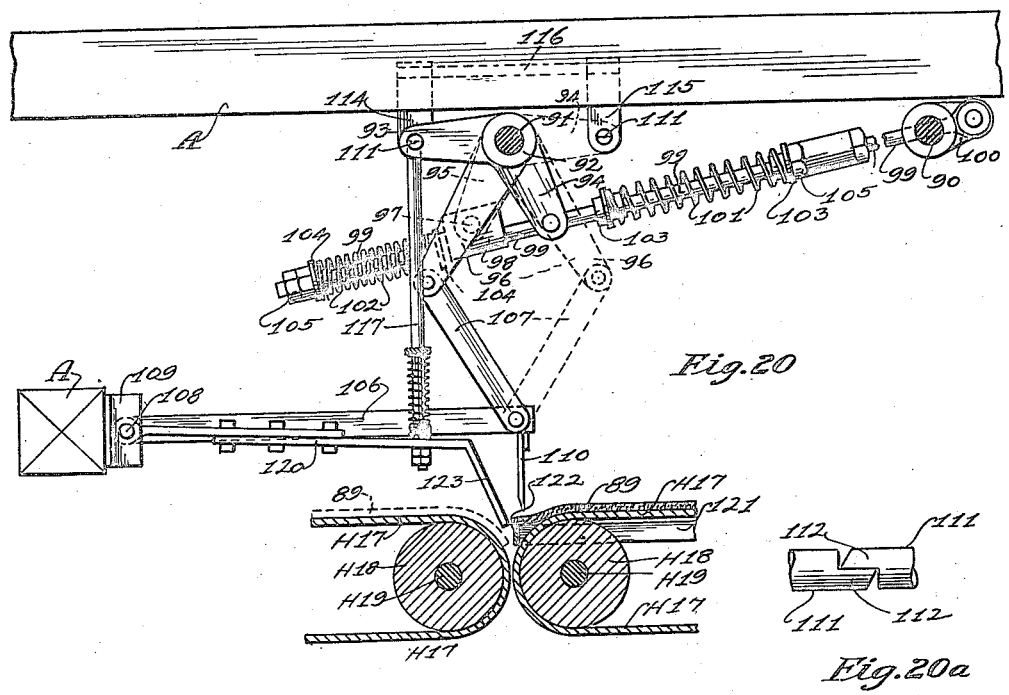
Fig. 20
Fig. 20a
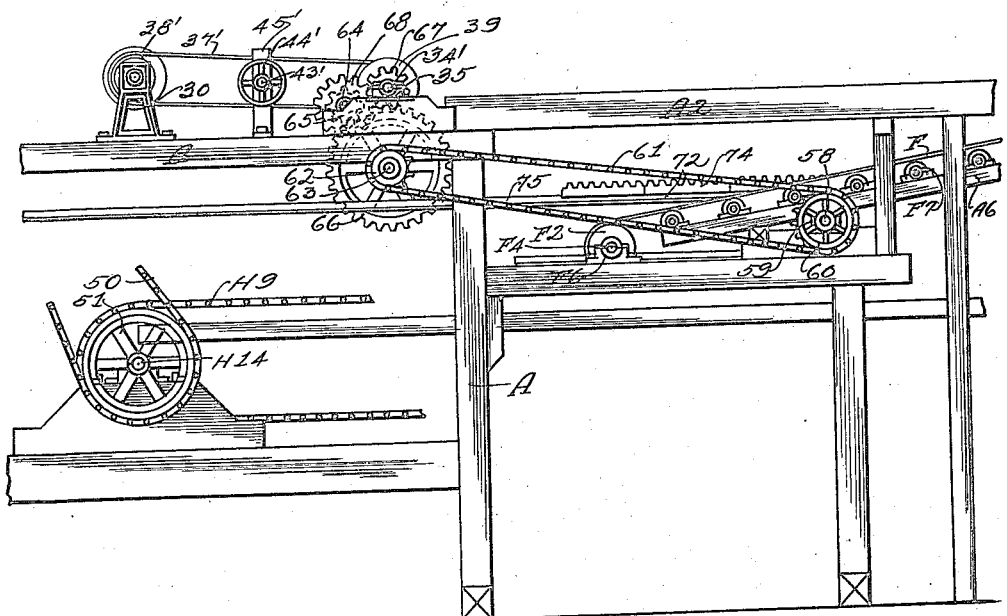
Fig. 19
INVENTORS,
Orville L. Routt,
Grover C. McConnell,
Herbert L. Glaze,

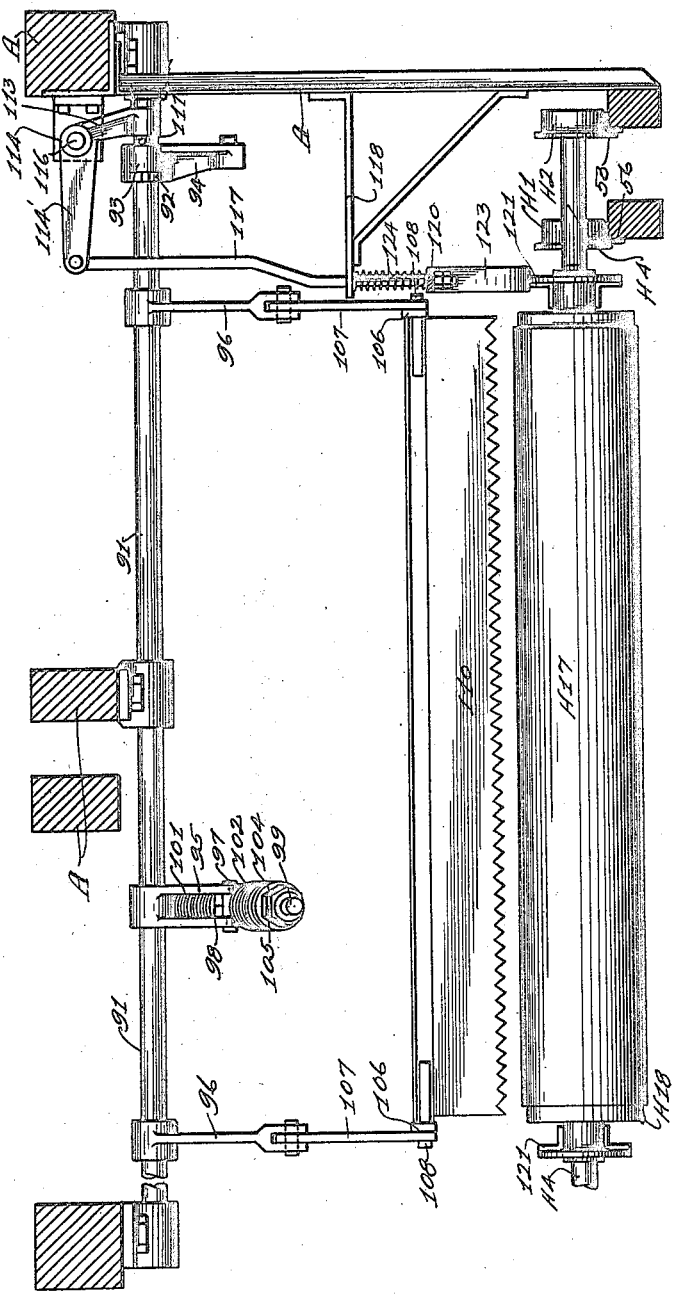

Patented Oct. 17, 1922.

1,432,261

UNITED STATES PATENT OFFICE.

ORVILLE L. ROUTT, GROVER C. McCONNELL, AND HERBERT L. GLAZE, OF LOS ANGELES, CALIFORNIA, ASSIGNORS, BY DIRECT AND MESNE ASSIGNMENTS, TO PLASTOID PRODUCTS, INC., OF LOS ANGELES, CALIFORNIA, A CORPORATION OF CALIFORNIA.

MACHINE FOR MAKING PLASTER BOARD AND THE LIKE.

Application filed September 13, 1918. Serial No. 254,859.

*To all whom it may concern:*

Be it known that we, ORVILLE L. ROUTT, GROVER C. McCONNELL, and HERBERT L. GLAZE, citizens of the United States, and residents of Los Angeles, in the county of Los Angeles and State of California, have invented new and useful Improvements in Machines for Making Plaster Board and the like, of which the following is a specification.

Our invention relates to a machine for manufacturing plaster board and the like by a continuous operation, and comprehends the mixing of the ingredients of the composition; the spreading of the same uniformly between sheets of suitable material in such a manner that the plastic substance will readily adhere thereto; cutting the material thus prepared and treated into suitable lengths; and then transferring the sections thereof in a novel manner to a suitable storage means by means of traveling pallets which are operated continuously to receive the output, transfer it, and discharging it on to said storage means.

The primary object is to prepare the plaster board by a continuous operation, with a minimum of manual labor and at a minimum expense, and also to eliminate unnecessary handling of the board while in a moist state, in order that the output may be uniform and regular and the element of waste eliminated.

Another object is to provide means for moistening the surface elements between which the plastic substance is formed, and applying an adhesive substance thereto in a dry state for contact with the plastic body of the board in order to insure a proper union of the elements of the board.

A further object is to provide mechanical means for feeding and mixing the main ingredients of the plastic body, and for discharging the same preferably at or near the junction of a pair of uniformly fed sheets of paper, or the like, so that the material can be molded therebetween, and for mechanically mixing and agitating a dry adhesive substance and then feeding the same to the adjacent surfaces of the said paper previous at the application of the plastic material thereof, the sheets of paper being first moistened so as to collect a thin coating of said dry adhesive matter for union with the plastic substance.

Another object is to provide a primary endless carrier or conveyor on which the plaster board may be formed in a continuous sheet and conveyed to a point of transfer, together with a plurality of secondary carriers, or pallets, which move in an endless path and procession before and beyond the terminus of the main carrier, and receive the sheet of board therefrom, the boards being then cut into sheets of selected lengths and transported flatwise on the secondary carriers, or pallets, to a point of discharge, whence the sheets or boards are discharged from the pallets upon a stationary pallet during the receding movement of said carriers.

Another object is to provide on each of said secondary carriers or pallets, an endless belt upon which the sheets or board may be carried and held in position after transfer thereto from the main carrier, with means connected therewith for moving said belts during the progress of the pallets with the boards thereon, in order to establish a differential between the main and secondary carriers, and thus compensate for any difference in speed therebetween, the speeds of said elements being substantially equal for boards of maximum length, and variable for shorter boards, thus rendering a differential necessary for the shorter boards in order that the board may be uniformly fed from the main carrier to the successive pallets.

A further object is to provide means for trimming the edges of the sheets of surface paper between which the plastic substance is formed, previous to the application of said substance thereto.

Another object is to provide a pair of like transmission elements for moving the pallets in a continuous and endless path and a system of tracks arranged at different levels in the path of travel thereof by means of which the pallets may be moved from one to another level, the forward movement of the pallets in the form of device shown being at the higher level and the return movement at the lower level, and said pallets being connected at one point, at least, with said transmission elements at all times during their movement.

Another object of our invention is to provide in a machine for handling sheet material, a pallet for receiving and carrying said sheet material flatwise thereon, and for discharging it onto another flat surface without any sliding action between the sheet material and the surface on which it is supported and carried, or between it and the surface onto which it is discharged, thereby avoiding any stretching or tearing of the material being handled. We accomplish this by providing a receiving and carrying surface adapted to roll from under the material, thereby allowing it to drop a minimum distance to the surface upon which it is discharged.

Another object of our invention is to provide adjustable means for storing the finished product, which means is adapted to gradually recede as the product is stacked thereupon, thus maintaining a substantially uniform level for the discharge of the finished product from the carrying pallets.

Another object of our invention is to provide in combination with an endless member, a series of rack sections attached thereto in such manner that said rack sections will turn around the guides for said endless member and when on a straight course, said rack sections will move end to end as a continuous rack.

Another object of our invention is to provide in combination with means for carrying a continuous sheet of material, cutting means with means for quickly actuating the same to cut said material at a predetermined position without interfering with the progress of said material.

A further object of this invention consists in the provision of means at the final point of discharge for the finished product whereby the output carriers may be moved in a plane above the discharging position for the output sections, in order that the said sections may be deposited flatwise, either singly or in stacks, together with cooperating means on the carriers and the frame adjacent to the discharging position for rolling the carriers from under the successive sections in such a manner that the sections will always register with the discharging position. The sections, which are plastic, are thus laid flatwise without any degree of slipping or sliding as the carriers are receded therefrom and during such movement the first portion of the section deposited at the discharging position will rest upon suitable means provided therefor while the remainder of the section is gradually removed from the carrier.

Other objects include the provision of change of speed gearing for altering the relative speed ratios of the several elements, and equalizing means for the transmission elements. Still other objects will appear as the description progresses.

Figure 6 is a top plan of the front end of the machine;

Figure 7 is an enlarged fragmentary side elevation of the rear end of the pallet conveying mechanism;

Figure 8 is a rear end elevation of the same;

Figure 9 is a side elevation of the mechanism for agitating and conveying the adhesive material to the carriers;

Figure 10 is a fragmentary end elevation of the same;

Figure 11 is a plan, partly broken away and partly in section, of the secondary carriers or pallets;

Figure 12 is a side elevation thereof partly in section;

Figure 13 is an end view thereof partly in section;

Figure 14 is a fragmentary view of the means for connecting the pallets with the conveyor chains;

Figure 15 is a side elevation of the front end of the pallet conveying mechanism;

Figure 16 is a fragmentary side elevation of the extreme front end of the machine showing means for transferring the pallets from an upper level to a lower level;

Figure 17 is a fragmentary sectional elevation of the front end of the machine showing the primary and secondary carriers, and a differential mechanism connected therewith;

Figure 18 is a fragmentary front end elevation of one of the pallets showing the connection of the differential mechanism therewith;

Figure 19 is a right hand fragmentary side elevation of the machine;

Figure 20 is a side view of the cutting mechanism;

Figure 1A:
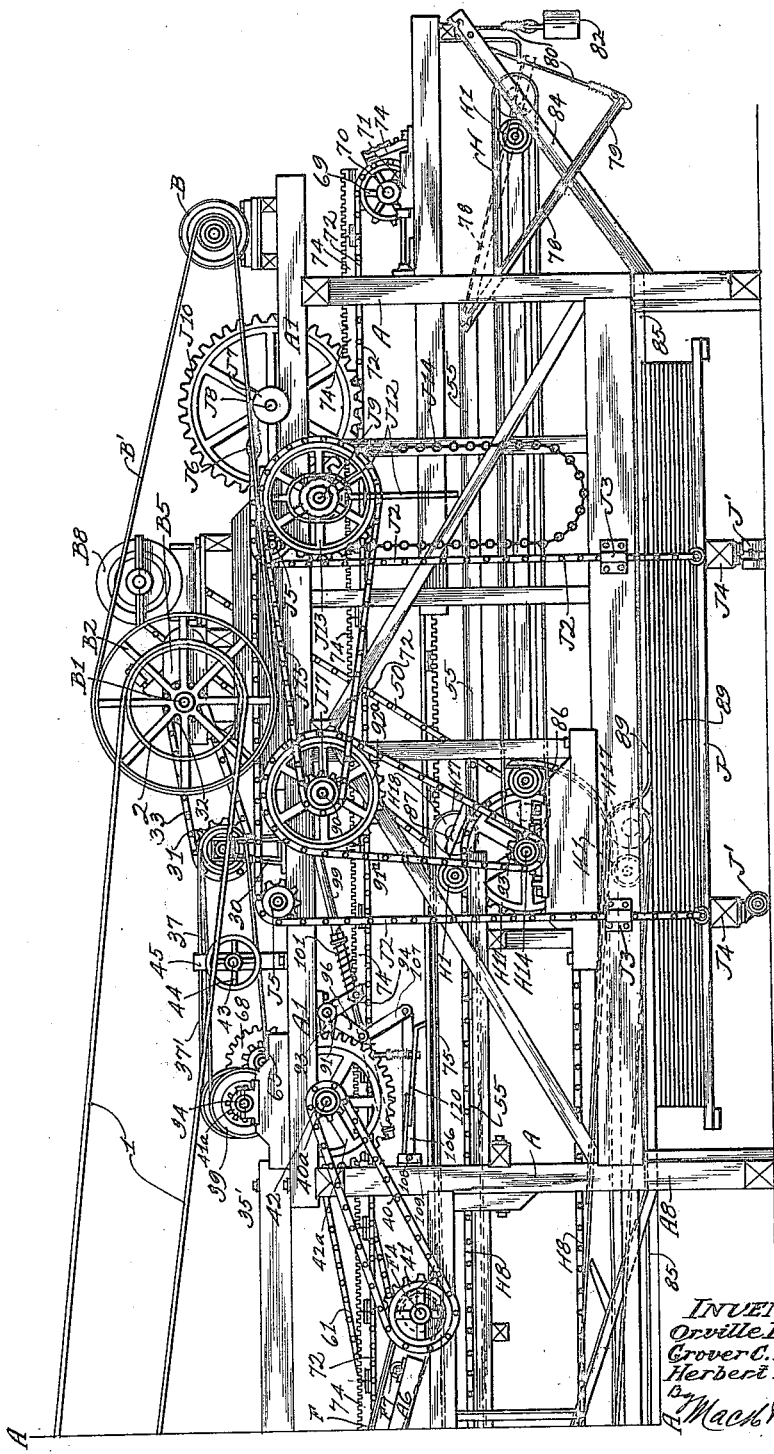
Figure 1 is a side elevation of the rear portion of our machine partly in section, and Figure 1ᵃ is a side elevation of the front portion of the same, the machine being divided for the purpose of illustration at line A—A, and said views showing portions on opposite sides of said line.
Figure 2:
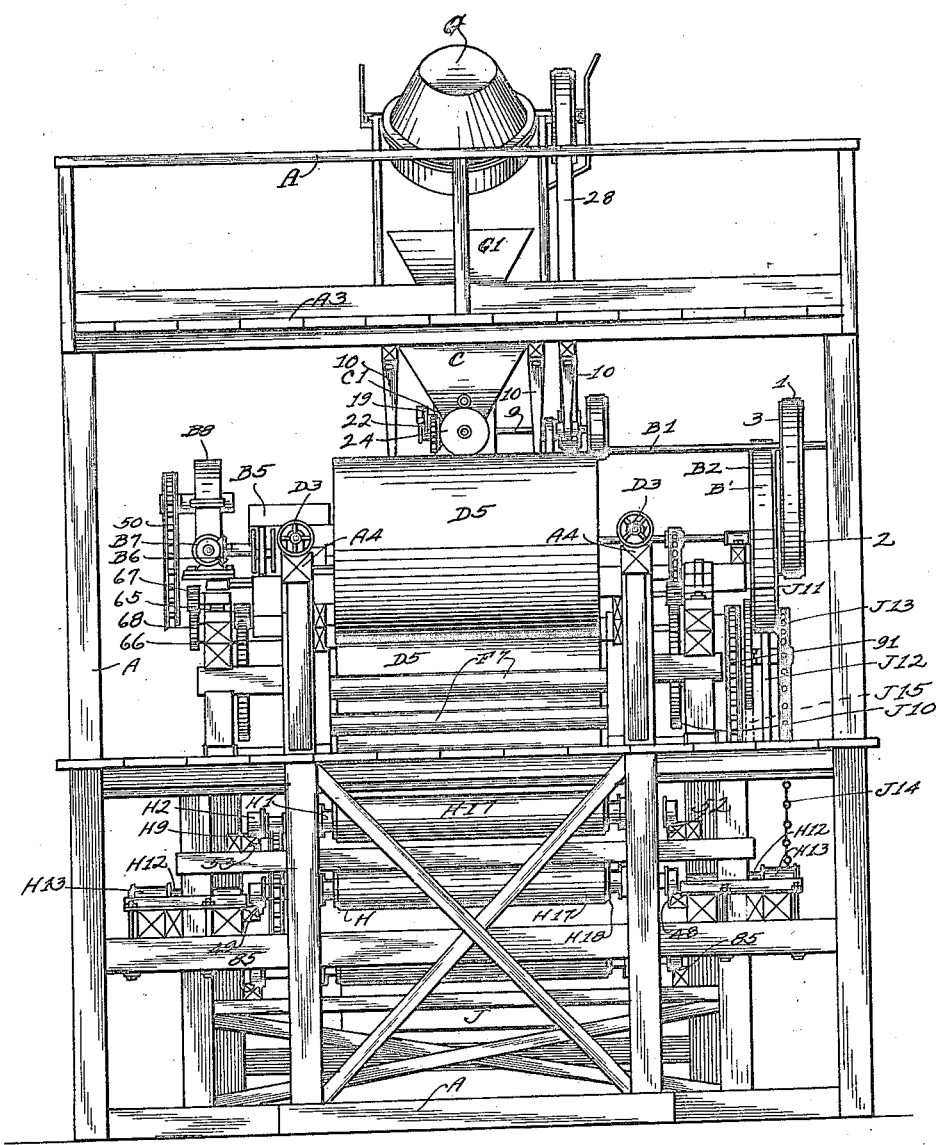
Figure 2 is a rear end elevation of the machine.
Figure 3:
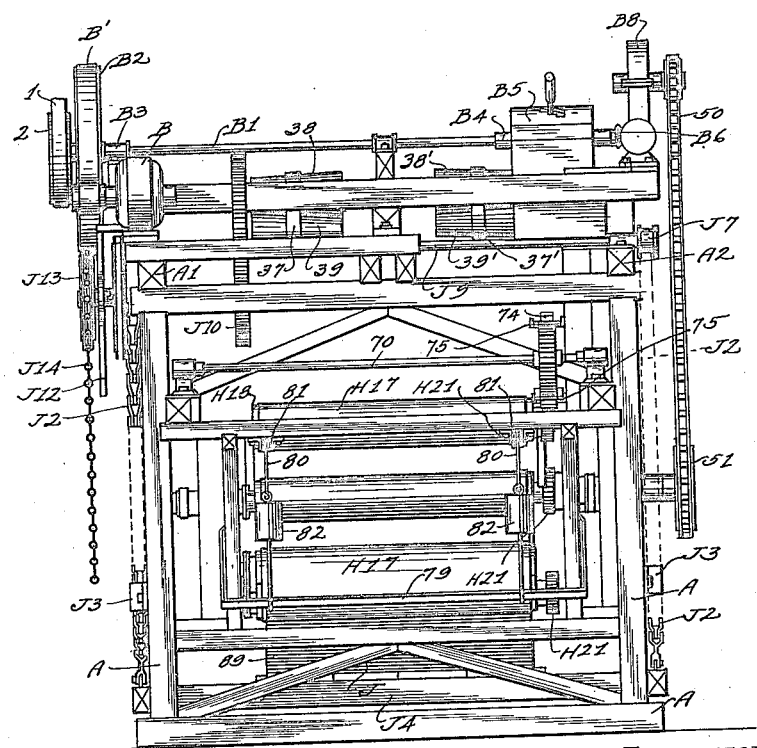
Figure 3 is a front elevation of the same.
Figure 4:
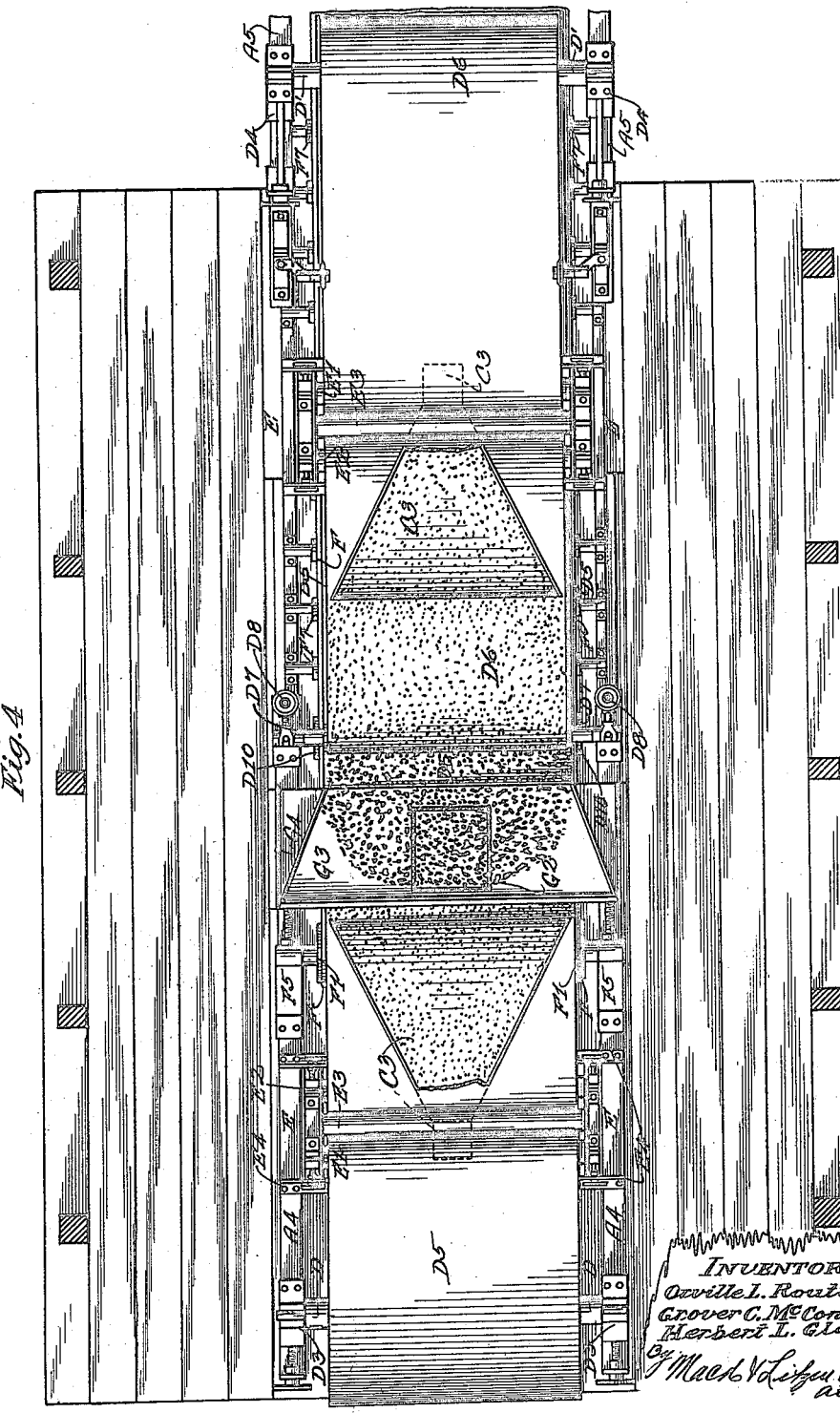
Figure 4 is a sectional plan of that portion of the machine shown in Fig. 1, on line 4—4 thereof.
Figure 5:
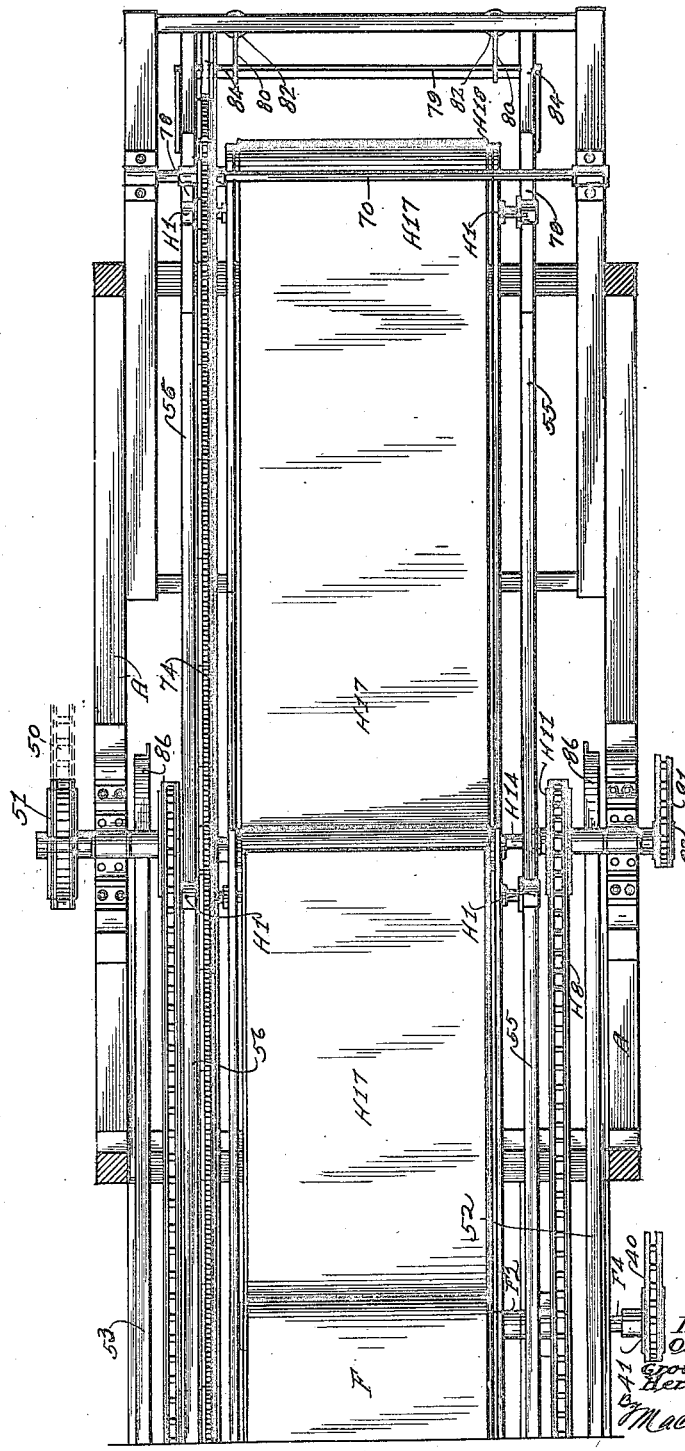
Figure 5 is a sectional plan of the front of the machine in about the same plane as Fig. 4.

Figure 20ª is a fragmentary view of the cutter latch pins;

Figure 21 is a transverse section of the cutting mechanism.

Similar characters of reference are employed in the specification and throughout the several views of the drawings for indicating the same and like parts.

A preferred embodiment of our invention is shown in the drawings for the purpose of illustrating and disclosing the principal features and elements thereof, but it will be understood that the structure shown is capable of modification in many details, without departing from the spirit of our invention.

Our improved mechanism is mounted on a convenient and suitable frame A, which may be of wood, or metal, as may be desired, and power is supplied for operating the several elements, to be hereinafter described, by means of a motor B, which is connected by means of a belt B', with a main driving shaft $B^1$ on which a pulley $B^2$ is carried, said shaft having a bearing $B^3$ on the top member $A^1$ of the frame, and is journaled at the opposite end in a bearing $B^4$ formed on a change-speed transmission box $B^5$. The box $B^5$ is suitably mounted on the top of the frame A, and is connected by means of beveled gears $B^6$ and $B^7$, with a worm gear set $B^8$, which is supported on the member $A^2$ of the frame. Motion is communicated from the front to the rear of the machine by means of a belt 1, which is driven by a pulley 2 on the shaft $B^1$ and operates over and drives a pulley 3 on a transverse shaft 4 which is journaled in frames 5 attached to the main frame A, as shown in Fig. 1.

A quantity of dry adhesive material is carried in a pair of hoppers C and C', which are located, respectively, at the opposite ends of the enlarged portion of the frame A, and below the upper platform $A^3$ thereof. Each of said hoppers has a conveyor $C^1$, connected with the lower end thereof and an agitator $C^2$, mounted in the lower portion of the hopper above said conveyors by means of which the material in the hoppers is constantly agitating during the operation of the machine and forced through the conveyors and thence into inclined chutes $C^3$, said chutes being slidably supported on hangers $C^4$ suspended from the frame A.

The forward chute $C^3$, is adapted to be reciprocated in its hangers by means of an eccentric 6, on shaft 4, which is connected with said chute by means of a connecting rod 7, and the chute $C^3$ of the rear conveyor is similarly reciprocated by means of an eccentric 8, on a transverse shaft 9, which is journaled in frame 10, said eccentric being connected with said chute by means of a connecting rod 11.

Shafts 4 and 9 are connected for operation by means of belts 12 and 13, which operate over pulleys 14, on a central counter shaft 15, which is supported in bearings 16 attached to the main frame A. Shaft 15 also carries cranks 17, which are connected by means of rods 18 with arms 19 carried by shafts 20 suitably supported on and extended from the hoppers C and C', the operation of said cranks and said rods serving to oscillate the shafts 20. The arms 19 have pawls 21 pivoted thereto which are adapted to engage and operate ratchets 22 on the shafts 20, at each operation of the cranks 17 on shaft 15, and a pair of beveled gears 24 and 25 connect the shafts 20 with the conveyors $C^1$, so that the conveyors will be intermittently operated by the cranks 17.

The conveyors $C^1$ and the agitators $C^2$, are connected for operation by means of gears 26 and 27. Rollers D and D' are carried, respectively, on shafts $D^1$ and $D^2$, which are journaled in adjustable bearings $D^3$ and $D^4$, mounted, respectively, at the opposite ends of the rear portion of the frame on inclined beams $A^4$ and horizontal beams $A^5$ of the frame A. These rollers carry, respectively, rolls of paper $D^5$ and $D^6$, which are adapted to be extended through moistening trays E, over the upper rollers $E^1$ and $E^2$ thereof, and under the lower rollers $E^3$, so that the paper will be submerged in the water carried in said trays and thoroughly moistened as it is advanced into the machine. The trays E of the moisteners are supported by means of suitable frames $E^4$ on the beams $A^4$ and $A^6$ of the frame, respectively, the sheet of paper from $D^5$ being stretched forwardly into the machine over and suitably attached to a primary carrier member or belt, F, which operates over a rear roller $F^1$ and a front roller $F^2$, on shafts $F^3$ and $F^4$, respectively, the shaft $F^3$ having adjustable bearings $F^5$, attached to the beams $A^4$, and the shaft $F^4$, having fixed bearings $F^6$ attached to the beam $A^6$.

A plurality of relatively small rollers $F^7$ are mounted at intervals on the upper and lower sides of the beam $A^6$ and another beam $A^7$, for stiffening the belt F, as shown in Fig. 1. The sheet of paper $D^6$ is stretched over the rollers $E^1$ and $E^2$ and under the roller $E^3$ of the forward moistener $E^4$, and thence over a roller $D^7$, which, is capable of vertical and horizonal adjustment in a supporting member $D^8$, carried on the beams $A^7$, said sides of the machine on the beams $A^7$, said frames also carrying a shaft $D^9$, with a roller $D^{10}$ thereon which registers with the roller $D^7$.

These sheets of paper $D^5$ and $D^6$ occupy planes just below the discharge ends of the chutes $C^3$ $C^3$, and as the two sheets of paper, which have a junction point between the rollers $D^7$ and $D^{10}$, are moved below the chutes, a thin layer of adhesive material is discharged from the chutes onto the upper surfaces of the sheets of paper, and as the paper has been previously moistened in the moistener E, the adhesive material will readily adhere to the paper.

A set of trimming knives comprising a pair of discs D¹¹ and D¹² are provided on opposite sides of and above the upper sheet of paper D⁶ and these knives are adjustably mounted on arms D¹³ and D¹⁴, respectively, which are supported on frames D¹⁵ attached to the frame members A⁵. Thus the upper sheet of paper may be trimmed at the edges so that the same may be slidably narrower than the lower sheet, as shown, for the lower sheet of paper being wider than the upper sheet, the belt on which the board is formed will be kept clean and free from accumulation of material of which the board is formed.

A mixer G, is suitably mounted on the platform A³ of the frame, and is operated by means of a belt 28, which is driven by a pulley 23 on shaft 4, and the plastic substance mixed therein is discharged therefrom into a hopper G¹ having a chute G² which terminates directly over an inclined tray G³ attached by means of a suitable frame G⁴ to the beam A⁴ of the main frame.

The material from the chute G² is deposited in the tray G³ and is discharged from the latter by gravity to the upper surface of the paper D⁵ at a point just in advance of the roller D⁷, the material being compressed between the upper sheet of paper D⁵ and the lower sheet D⁵ by rollers D⁷ and D¹⁰.

The thin coating of adhesive material which is applied to the adjacent surfaces of the paper sheets readily and quickly adhere to the plastic material therebetween and forms a close union between the paper sides of the board and the body thus formed, the board being formed as indicated in a single and continuous sheet between the rollers D⁷ and D¹⁰, and subsequently moved at a slow rate of speed forwardly of the machine on the primary carrier F until the roller F⁴, which forms a forward terminus for the belt F, is reached when it is otherwise disposed of, as will be hereinafter described.

Referring to Fig. 6, a transverse shaft 29 is provided on the top of the frame A, and is journaled at both ends in the center of bearings 30, said shaft being operated by means of a sprocket 31 thereon, which is connected with a sprocket 32 on shaft B¹, by means of a chain 33. Also on the top of the frame A, substantially at the rear of the shaft 29 and parallel therewith, we provide a pair of axially alined shafts 34 and 34', which are mounted at the outer ends in bearings 35 and 35', respectively, and have a common central bearing 36. Shaft 34 is rotated by means of a belt 37, which is driven from a cone pulley 38 on shaft 29 and operates over a similar pulley 39 on shaft 34, said cone pulleys being reversely positioned on their respective shafts. Shaft 34' is operated by means of a belt 37' and cone pulleys 38' and 39', respectively, held in reversed positions on the shafts 29 and 34'. The shaft F⁴ which drives the primary carrier F, is connected with the shaft 34 by means of a sprocket chain 40 and sprockets 41 and 42 carried, respectively, on shaft F⁴ and a short shaft 40ª below shaft 34, and a pinion 41ª on shaft 34 drives a gear 42ª on shaft 40ª. The belts 37 and 37' which connect the cone pulleys on the parallel shafts hereinbefore described, are capable of being shifted longitudinally of the pulleys by means of adjusting screws 43 and 43', having hand wheels 44 and 44', bearings 45 and 45' at the outer ends thereof adjacent the said hand wheels and 46 and 46' at the inner ends. Shifting yokes 47 and 47' are provided on said screws for moving the belts with the turning of the screws in the bearings. This belt shifting mechanism is necessary in order that the relative speeds of the carrier F and other elements of the machine may be accurately adjusted for uniform and synchronous movement, so as to prevent the breaking or stretching of the plaster board.

A plurality of secondary carriers, or pallets H are provided in our machine which are adapted to be moved in a continuous procession from a point rearwardly of the forward terminus of the primary carrier belt F to a point at the extreme front of the machine from which they are returned in procession to the point of beginning, the forward travel of said pallets being from an intermediate level to a plane slightly below that of the belt F and the rearward travel thereof being in a substantially lower plane and thence rearwardly to said intermediate level.

The pallets are provided with rollers, or wheels, near their front ends and wheels H² near their rear ends, and said wheels are mounted on transverse axles H³ and H⁴, respectively, the axles being preferably rotatably mounted in the frame H⁵ of the pallets at points midway of their ends, in order that a slight movement of said axles may be permitted for reasons which will appear hereinafter. The front wheels H¹ are spaced in closer relation than are the rear wheels H² and said front wheels rest, as shown in Fig. 1, at the intermediate level of the pallets, upon a pair of horizontal tracks 48 and 49. The rear wheel axles H⁴ of the pallets are attached by means of U bolts H⁶ and special links H⁷ to a pair of parallel sprocket chains H⁸ and H⁹, which operate over rear sprockets H¹⁰ and front sprockets H¹¹, so that the pallets may be moved continuously back and forth by means of said chains, at regular intervals.

Rear sprockets $H^{10}$ are rotatably held on spaced and axially alined transverse shafts $H^{12}$ which are journaled in bearings $H^{13}$ supported on the frame A of the machine, said bearings being preferably adjustable, for regulating the tension of the chains $H^8$ and $H^9$, and the front sprocket $H^{11}$ are carried on a single transverse shaft $H^{14}$ which is journaled in bearings $H^{15}$ supported on the frame A of the machine. Chains $H^8$ and $H^9$ are operated by means of a sprocket chain 50 which operably connects the worm gear set $B^8$ on the top of the front portion of the machine with a sprocket 51 on one end of shaft $H^{14}$.

When one of the pallets H occupies a position such as shown in Fig. 1, that is, in the horizontal plane of the axis of the rear sprockets $H^{10}$, the front wheels thereof will rest upon the tracks 48 and 49 and the rear end of the pallet will be carried and supported in such position by means of their connection with the chains $H^8$ and $H^9$, and a forward movement of these chains will raise the rear end of said pallet to a plane below the primary carrier belt F so that the rear wheels thereof may engage and move forward at the higher level on a pair of tracks 52 and 53, said tracks extending forwardly from the center of the sprockets $H^{10}$ to the center of sprockets $H^{11}$. In the mean time, the forward end of said pallets will move upwardly over a pair of hinged tracks, or switches 54 which connect with the tracks 48 and 49 at the intermediate level and with other tracks 55 and 56 in the same planes therewith at the higher level.

All of the pallets are in all respects similar and have a bed formed, preferably, of spaced and staggered slats $H^{16}$ and an endless conveyor or belt $H^{17}$ substantially of the width of the bed, which operates over rollers $H^{18}$ carried on shafts $H^{19}$ at the ends of the pallet, said shafts being supported in bearings $H^{20}$ suitably attached to the frame of the pallets, and the bearings for one of said rollers being adjustable for tightening the belt. These wide belts $H^{17}$ are adapted to move with their pallets in a plane slightly below the primary carrier belt F and to receive the plaster board therefrom, as shown, certain predetermined lengths of said board being deposited thereon and moved forward as will appear hereinafter. The pallets are adapted to be moved at exactly the same speed as the carrier F when board sections of maximum length are being made, but the speed of the pallets is changed to correspond to the different lengths of board sections.

The belts $H^{17}$ of the pallets H are adapted to be moved rearwardly thereof while the pallets are being at the same time carried forward in the machine, in order to establish a differential between the pallets and the primary carrier F, when board sections of shorter than the maximum length are being made, and for this reason a differential mechanism is provided in our machine, which I will now describe.

A sprocket 57 is carried on a transverse shaft 58 in bearings 59 supported on the frame A at a point to the rear of the primary carrier roller $F^2$, said shaft being driven by means of a sprocket 60 thereon which is connected by means of a chain 61 with a smaller sprocket 62 carried by a short transverse shaft 63 positioned just below the top of the frame A and about in line with the shaft $40^a$ thereon. Shaft 63 is driven from a countershaft 64 by means of gears 65 and 66 and said countershaft is driven from shaft 34' by means of gears 67 and 68, as shown in Fig. 6. Sprocket 57 is connected with another similar sprocket 69 carried on a shaft 70 at the front end of the machine in bearings 71, by means of a chain 72, said chain operating in a plane substantially to one side of the path of the pallets.

Chain 72 has a plurality of special links 73 at regular intervals thereon, to each of which is attached a short section of a rack 74 provided with the usual gear teeth, one end of each of said sections being attached to the chain and the other end thereof being free. Adjacent sections of said rack, however, register so as to form a continuous horizontal rack except when they are being moved around the sprockets 57 and 69. Angle iron tracks 75 are provided at the top and bottom planes of movement of said rack upon which the rack sections rest and slide, thus serving to hold the rack in a true horizontal plane.

The forward shafts $H^{19}$ of the pallets carry gears $H^{21}$ thereon at one of their ends which mesh with the rack sections 74 when the latter occupy their lowest horizontal plane of movement, and it will be obvious that when a maximum length of board is being made, the normal speeds of primary carrier F and the pallets H being the same, as established through the gear change box $B^5$, the movement of the pallets and the chain 72 will not move the belts $H^{17}$ on the pallets; but, when the speed of the pallets is changed by means of said gear box and thereby is different from that of the carrier F, rotation of the gears $H^{21}$ of the pallets will be thus effected and the belts $H^{17}$ will be correspondingly moved forwardly on the pallets so that the sheet of board being fed from the carrier F to the belt $H^{17}$ on a pallet may be spread evenly on said belt, the belt moving rearwardly on the pallet at a speed which will compensate for the bodily forward movement of the pallet. In the case of a board section smaller than the maximum, the speed of the pallets will be correspondingly greater than the carrier F and when a predetermined length of board is disposed upon a belt $H^{17}$, the forward end of the primary sheet of board will have been retracted from the front end of the pallet for a given distance. The board may then be cut at the rear end of the pallet in any suitable manner, but a suitable form of cutter will be hereinafter described in detail.

The movement and arrangement of the pallets, four pallets being shown in the drawings, is such that one of the units will immediately follow another in procession by the terminus of the carrier F with but scant intervening space and so that the end of the primary sheet of board will fall upon the front of a succeeding pallet.

The upper tracks 55 and 56 for the front wheels of the pallets extend substantially forward of the front pallet moving sprockets $H^{11}$, and have hinged switch sections 78 for engagement with the rear axles of the pallets so that as the front wheels move forward over these tracks 55 and 56, the rear wheels and axles moving on the outer tracks 52 and 53, Figs. 15 and 21 may operate the switch 78 and move downwardly off the ends of tracks 52 and 53, over the sprockets $H^{11}$ and to the members 86.

The front ends of tracks 55 and 56 have pivotally inclined sections 78 which are connected at the end of the frame A by means of members 79 by means of which they may be held suspended from cables 80 operating over drums 81 carried on the end of the frame A and to the opposite ends of which cables weights 82 are attached for raising the track sections to their uppermost positions as indicated in broken lines in Fig. 1$^a$. Stops 83 depend from frame A for engaging and limiting the upward movement of the track sections 78.

At about the same instant that the rear wheels of the pallets begin to descend around the sprockets $H^{11}$, following the chains $H^8$ and $H^9$, the front wheels of the pallets engage the track sections 78 and move downwardly and forwardly thereon and from thence downwardly on to the oppositely inclined tracks 84, as shown in Fig. 16, the tracks 78 being then restored upwardly to normal position by means of the weights 82. When the rear ends of the pallets subsequently begin their rearward movement around sprockets $H^{11}$ the front wheels likewise begin to move downwardly and rearwardly over tracks 84 and from said tracks on to horizontal tracks 85 at the lowest level of the pallets, said tracks 85 extending rearwardly of the machine to points opposite the frame posts $A^8$ and then said tracks are directed upwardly in inclined planes to the tracks 48 and 49 at the intermediate level.

The rear wheels of the pallets in the meantime engage curved tracks 86 which are radially disposed relative to sprockets $H^{11}$ and extend horizontally therefrom to about the center of the rear sprocket $H^{10}$. The rear wheels of the pallets on the return trip are thus held in a true horizontal plane, preferably, while the front wheels are lowered to the intermediate level during such movement. When the rear axles of the pallets reach a point about midway of the ends of the inclined portions of tracks 85 Fig. 12, said axles engage bars 87 on the tracks which lift the sections of these tracks so as to permit the rear axles to pass therebeneath.

When the pallets reach their lowest level at the front of the machine and assume horizontal positions, the gears $H^{21}$ engage stationary racks 88, as shown in Fig. 16, and the movement of the pallets longitudinally of the rack serves to rotate said gears, thus causing a forward movement of the belts $H^{17}$ and discharging the board sections 89 from said belts upon a receiving pallet J which is provided therebelow. The pallet J is portable on casters, or rollers $J^1$, so that when a stack of board sections has been deposited thereon, the same may be moved to points exterior of the machine for further disposition of the boards.

The receiving pallets J are suspended from the frame A of the machine upon chains 22, a pair of which are employed on each side of the machine and are slidable in suitable guides $J^3$ attached to the frame A. Said chains are removably attached at their lower ends to transverse beams, or rails, $J^4$ on pallets J and extend upwardly and rearwardly therefrom over sprockets $J^5$ which are carried on the upper portion of the frame. The upper ends of these chains are attached to cables $J^6$ which are adapted to wind on drums $J^7$ carried on the extended ends of a transverse shaft $J^8$ on the top of the frame.

Shaft $J^8$ is geared to a lower transverse shaft $J^9$ by means of gears $J^{10}$ and $J^{11}$, and the outer end thereof carries a clutch $J^{12}$, and hand wheel $J^{13}$, which is adapted to be operated by means of a depending chain $J^{14}$. Shaft $J^9$ is rotated by means of a chain $J^{15}$, which operates over a sprocket $J^{16}$ thereon, and a smaller sprocket $J^{17}$ on another parallel shaft 90, which is supported beneath the upper beams of the machine frame in about the same horizontal plane as shaft $J^9$. Motion is communicated to shaft 90 from the front pallet operating shaft $H^{14}$, by means of a chain 91$^a$, which operates over a sprocket 92$^a$ on shaft 90, and a smaller sprocket 93, on shaft $H^{14}$.

Thus as the pallets are continuously moved forwardly with their successive sections of plaster board thereon, the said sections are successively discharged therefrom, in the manner stated, upon the top of the stack which is carried on the receiving pallet J, and when the clutch J¹², on shaft J⁹, is in operative position, the shaft J⁸ will be slowly rotated so that the receiving pallet J may be slightly lowered, by means of the supporting chains J², in order to provide space for each succeeding section of board. When the pallet J has been filled with sections of board, the chains J² may be disconnected therefrom and the pallet then removed laterally from the machine and unloaded and a new pallet placed in receiving position beneath the machine, and in such case, the clutch J¹² is disengaged and the hand wheel J¹³ turned by means of the chain J¹⁴, for raising the new pallet to its highest plane and in position for receiving the first of another load of board sections, the chains J² having been first connected to the pallet J, for this purpose. When the clutch J¹² is again engaged, the machine is in readiness for another operation.

It will be observed from the foregoing description and the disclosure of our invention in the drawings, that the pallets H are at all times in an upright position, and are therefore, irreversible in character, although they move forwardly and backwardly in the machine and in different planes of operation. The space between the rear pallet operating sprockets permits the rear ends of these pallets to move therebetween, while the rear ends of the pallets at their forward extreme of movement will substantially clear the forward shaft H¹⁴.

While the plaster board, delivered in a continuous sheet from the primary carrier F, may be cut in desired lengths by any suitable means, a preferred form of device for cutting the board is shown in the drawings and reference is had particularly to Figs. 20, 20ᵃ and 21 for the details of the same, the cutter being operated from the shaft 90, just described, and said shaft being geared from shaft H¹⁴, so as to rotate at the rate of one half of a revolution for each section of board made, regardless of the length thereof. Shaft H¹⁴ is geared to rotate at the rate of two revolutions for each section of board, thereby making the relation between shafts H¹⁴ and 90, four to one and the number of cutting operations two for each complete revolution of shaft 90.

A transverse rocker shaft 91 is provided on frame A, which carries a bell crank 92, having a pair of arms 93 and 94, a bifurcated lever 95, and a pair of depending levers 96, all of which members are suitably pinned or otherwise attached thereto for movement therewith. The arms of said bell crank are adapted to alternately occupy horizontal positions, as indicated in Fig. 20, while the other depends downwardly at an angle therefrom.

Lever 95 is pivotally attached by means of a pin 97, to a sleeve 98, between the arms thereof, and said sleeve is bored to receive a cutter actuating rod 99, which is connected at its forward end with a crank 100, on shaft 90. This rod is provided with a pair of coiled springs 101 and 102, which are adapted to be alternately placed in compression between the sleeve 98, and collars 103 and 104 on opposite portions of rod 99, between which and other similar collars at the opposite ends of said springs, the springs are held on the rod. The collars 103 and 104 are held in position by means of nuts 105, as shown, At each side of the machine and in the path of movement of each side of the pallets, the levers 96 are positioned and their lower ends are pivotally connected with the extended ends of a pair of horizontal bars 106, by means of toggle links 107, the rear ends of bars 106, being pivoted at 108 in suitable brackets 109, attached to the frame A of the machine. A cutting knife 110 is held in a substantially vertical plane on the ends of the bars 106, and is of a width substantially equal to that of the pallets, and having cutting edge serrated, as shown. The knife is held normally out of the path of the pallets by means of a suitable latch mechanism consisting of a pin 111, such as are shown in Fig. 20ᵃ, which have tapered and flattened contacting end portions 112 and are carried in the ends of the arms 93 and 94, of the bell crank 92, and are adapted to be engaged, respectively, by similar pins carried in the ends of an arm 113 of a bell crank 114, and a depending lever 115, carried on a short longitudinal shaft 116, supported on the frame A. Bell crank 114 and lever 115 are pinned to shaft 116 for simultaneous movement and occupy positions on opposite sides of the center of rocker shaft 91 in the arc of movement of the arms 93 and 94, of bell crank 92, so that when these are raised to substantially horizontal positions the latch pins will engage and hold rocker shaft 91 and the levers thereon in stationary positions pending another operation of the cutter. Arms 114′, of bell crank 114, as shown in Fig. 21, is pivotally connected with the upper end of a substantially vertical rod 117, which is slidably disposed in a bracket 118, supported on the frame A, and is attached by means of nuts 119, to the extended end of a cutter control member 120. The pallets H have angle iron members 121, of their frames at the sides of their beds and belts H¹⁷, to the rear ends of which are suitably attached transverse bars, 122, and overlie the peripheries of the belts H¹⁷, and the extreme ends of the pallets. The control member 120 is pivoted on a common axis with the bars 106, and has a diagonally extended and depending end 123, which is adapted to ride upon the edge of one of the pallet side members 121 and is held thereon resiliently by means of a spring 124, adapted to compress between the bracket 118, and the member 120.

In operation, when the control member 120 is held upwardly by means of its engagement with the pallet members 121, the arm 114' of bell crank 114, will likewise be held in a normally horizontal position so as to engage the latch on the depending arm of said lever with the latch in arms 93, provided the several elements are in relative positions shown in the drawings, and rocker shaft 91 will be held against movement. A previous movement of shaft 91 and the latching thereof as described, will have moved the lever 95 and sleeve 98 rearwardly on the rod 99, so as to compress the spring 102, and the cutting mechanism will then be in readiness for a cutting operation. The pallets H move forward with but scant space therebetween, as indicated, and at the same speed, and when the rear end of one of the pallets reaches a point beneath the knife 110, the member 120 will disengage the side member 121 of the pallet, thus moving downwardly and unlatching the shaft 91, whereupon the tension of spring 102 will effect a forward movement of the toggle levers 96 and 107 and the downward thrust of the knife 110, through the board carried on the pallet conveyors $H^{17}$, the board being sheared off at the side of the transverse bars 122. The forward section of board thus cut will be carried forward on the forward pallet while the rear portion of the board will fall upon the curved surface of the belt $H^{17}$, of the succeeding pallet, and the control member 120 will immediately engage the member 121 of the rear pallet and latch the mechanism for another operation. This second operation, however, is effected through reversing the positions of the toggle and latch elements, the members 96 and 107 being moved to the opposite positions, as indicated in broken lines in Fig. 20, the arm 93 being moved downwardly and the arm 94 moved into horizontal position so as to engage the latch on lever 115 of shaft 116. The right hand spring 101 is then placed in compression by the next operation of the crank 100, after such reversal, and operates the mechanism the next time.

In the consideration of our invention it must be understood that the operation of our machine is extremely slow in order to accomplish the several functions enumerated and in the manner described. Also the means provided for equalizing the speeds of the primary carrier, and the control chain and rack is desirable because of the fact that it is difficult to ascertain the pitch line speed of said carrier, and means is therefore provided whereby these speeds may be regulated so as to provide a uniform product in the machine and prevent defects occurring in the process of manufacture.

Furthermore it will be understood that the primary carrier operates at a constant speed, while the bodily movement of the secondary carriers, or pallets, is variable, to correspond to the difference in length of the product of the machine. The pallets move continuously back and forth, and the belts carried thereby move rearwardly thereon, or in a direction opposite to that of the pallets, so that regardless of the speed of the pallets, a given point on one of the belts will be moved in the machine at exactly the same speed as the primary carrier F. In other words, if the speed of the carrier F, is 12 feet per minute, and the speed of the pallets 20 feet per minute, the net speed of the belts $H^{17}$ will be the difference between these two speeds, or 8 feet per minute, in a reverse direction to said other elements, thus compensating for the difference in speed between the primary and secondary carriers, and insuring the operation of the cutter at the proper time for each pallet, or board to be cut, regardless of the length thereof.

The discharge of the board sections from the movable pallets to the receiving pallet is accomplished, as stated, through the forward movement of the belts $H^{17}$, on the pallets during the rearward movement of the pallets, a stationary rack being employed for accomplishing this movement, whereas a movable rack is employed in the first mentioned operation.

We claim:

1. In a machine of the character referred to, in combination, a discharge member, an endless conveyor member, means for driving the same, a plurality of pallets attached to said conveyor to travel therewith, each conveyer having an endless conveyor as a part thereof, and adapted to receive matter from said discharge member, means for driving the pallet conveyor during the travel of the pallet moving conveyor, and means for changing the speed of the pallet moving conveyor.

2. In combination, a discharge conveyor for matter, a series of pallets to receive matter therefrom, each of said pallets having an endless receiving and discharging member as a part thereof, means for moving said pallets bodily along a course of travel near said discharge conveyor, means for equalizing the speed of said discharge conveyor and the speed of said pallets, means for operating the endless receiving and discharging member of each pallet in a direction opposite the direction of travel of the pallet during its receiving and discharging functions.

3. In combination, a discharge conveyor for matter, a series of pallets connected to be moved successively along a course of travel near said discharge conveyor, means for moving the same, each of said pallets having an endless receiving and discharging member as a part thereof, and means for operating the endless receiving and discharging member of each pallet in a direction opposite the direction of travel of the pallet during its receiving and discharging functions.

4. In combination, a discharge conveyor for matter, a series of pallets connected to be moved successively along a course of travel near said discharge conveyor, means for moving the same, means for equalizing the speed of said pallets and the speed of said discharge conveyor, each of said pallets having an endless receiving and discharging member as a part thereof, means for moving the endless receiving and discharging member on each pallet during the bodily movement of the pallet along its receiving position near said discharge conveyor, and fixed means for operating said endless receiving and discharging members as said pallets move near the same, whereby to discharge the matter carried by said pallets.

5. A machine of the character described including a primary carrier, secondary carrier means for receiving the output therefrom, means for changing the relative speeds of said primary and secondary carriers for different lengths of board, and means compensating for the difference in speed between said carriers, so as not to affect the transfer of the output from one to the other of said carriers.

6. A machine of the character described including relatively variable speed primary and secondary carrier means, means for transferring the output from said primary carrier to said secondary means, and means on said secondary means for establishing a differential between the primary and secondary means during the transfer of the output.

7. A machine of the character described including relatively variable speed primary and secondary carrier means, whereby the output of the machine may be transferred from said primary carrier means to said secondary means, control means for regulating such transfer, and means for discharging the output from the secondary carrier means.

8. A machine of the character described including a constant speed primary carrier for delivering the output in a continuous sheet to a point of transfer, a procession of regularly spaced secondary carriers movably supported relative thereto and adapted to receive the output therefrom, means for varying the speed of said secondary carriers relative to said primary carrier, and means supported on said secondary carriers whereby a differential is established between the primary and secondary carriers for compensating for the difference in speed.

9. A machine of the character described including a primary carrier for delivering the output to a point of transfer in a continuous sheet, a plurality of regularly spaced pallets movably supported relative to said primary carrier and for receiving the output therefrom at the point of transfer, variable speed means for said secondary carriers, said secondary carriers having endless conveyors thereon for holding the output, and means for controlling the operation of said conveyors, as and for the purpose set forth.

10. A machine of the character described including primary output delivery means, secondary output carrier means supported for continuous movement relative thereto, in constantly upright positions and at different levels, for receiving and discharging the output, and means for regulating the speed of said secondary carriers relative to the length of sections of said output.

11. A machine of the character described including a carrier for the output, secondary carrier means continuously movable thereby for receiving the output, means for varying the speed of the secondary carrier means relative to said primary carrier, a continuously operable control element for regulating the transfer of the output from the primary to the secondary carrier means, said control element being operable at an equal speed with the primary carrier, and means for equalizing the speeds of said primary carrier and said control element.

12. A machine of the character described including a primary carrier, secondary carriers for receiving the output therefrom, a control element for regulating the transfer of the output from the primary carrier to said secondary carriers, and means for equalizing the speeds of said primary carrier and said control element.

13. In a machine of the character referred to, in combination, means for forming and discharging plaster board and the like, a traveling conveyor, a series of pallets connected to and moving with said conveyor, each pallet comprising a frame with an endless belt thereon to receive and support the plaster board as it is discharged thereupon, means for operating the endless belt during the travel of the pallet to discharge the plaster board therefrom, said pallets traveling the same path in substantially horizontal positions all the while.

14. In a machine for forming plaster board and the like, a series of traveling pallets, each comprising a frame with an endless belt thereon adapted to receive said plaster board flatwise thereupon, a supporting structure having upper and lower track ways for said pallets, means for moving the pallets successively along said track ways in horizontal positions, means for transferring the opposite ends of the pallets simultaneously from one trackway to the other, means for operating the endless belts on the pallets to discharge the plaster board therefrom during the travel of the pallets, and means for receiving the plaster board as it is discharged from said pallets.

Signed at Los Angeles, in the county of Los Angeles, and State of California, this 30th day of August, 1918.

ORVILLE L. ROUTT.
 GROVER C. McCONNELL.
 HERBERT L. GLAZE.

In presence of—
 H. M. BRUNDAGE,
 W. R. LITZENBERG.